UNITED STATES PATENT OFFICE.

JOHANNES MOHLER, OF BASLE, SWITZERLAND, ASSIGNOR TO THE SOCIETY OF CHEMICAL INDUSTRY, OF SAME PLACE.

BLUE DYE.

SPECIFICATION forming part of Letters Patent No. 420,164, dated January 28, 1890.

Application filed August 6, 1889. Serial No. 319,993. (Specimens.)

*To all whom it may concern:*

Be it known that I, JOHANNES MOHLER, a citizen of Switzerland, residing at Basle, Switzerland, have invented new and useful Improvements in the Production of a Blue Coloring-Matter for Dyeing and Printing, of which the following is a specification.

This invention relates to the production of a blue coloring-matter from the hydrochloride of nitroso-dimethylaniline and the crystallized condensation product from tannin with aniline.

Tannin heated for several hours with aniline produces (as described by H. Schiff, Ber. d. deutsch Chem. Gesellsch., Bd. XV, 2591) a substance which crystallizes easily; also, the homologues ortho and para toluidine and the technic xylidine condensed with tannin produce similar condensation products. The constitution of these condensation products is not yet ascertained. They seem to be anilid combinations of the tannin. If these condensation products dissolved in boiling alcohol are submitted to the action of hydrochloride of nitroso-dimethylaniline, blue coloring-matters crystallize out of the product of the reaction. These blue coloring-matters, (which are soluble in alcohol,) when heated with bisulphite of soda and alcohol, are transformed into combinations which are soluble in water and crystallize in small light-green needles. These bisulphite combinations are nearly insoluble in cold water, but easily soluble in warm water. With the aid of tannin, alum, or chrome mordant they dye cotton in shades from a brilliant blue to blue violet. Used for printing on cotton (mordanted with alum or chrome mordant) they produce blue shades.

Example of process: One kilo of the condensation product of tannin with aniline, one kilo of hydrochloride of nitroso-dimethylaniline, together with ten kilos of alcohol, (or other diluting agents, as acetic-acid water,) are heated up to boiling until no intact nitroso combination is left. The brownish mass is filtered and washed with alcohol until the latter shows a pure blue coloration. The coloring-matter—a brilliant olive-green crystalline powder—remains in the filter. It is distinguished from the products derived from gallic acid and nitroso substances (for instance, gallocyanine, prune, &c.) by its insolubility in water and alkalies, instead of benzol and bisulphide of carbon. The coloring-matter is difficultly soluble in alcohol, in glacial acetic acid somewhat easier, and showing a dark-blue color. Diluted acids dissolve it but little and produce a red coloration. Even at 200° centigrade the product does not melt. In concentrated sulphuric acid it dissolves with a blue violet shade. If this solution is diluted with water, the coloring-matter precipitates in form of dark violet flakes. Concluding from its formation, the coloring-matter is to be classed among the phenoxazines, and its formula may be therefore represented by $C_{28}H_{21}N_3O_3HCl$, according to the equation

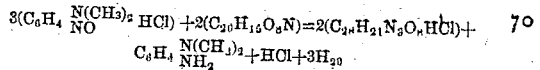

$$3(C_6H_4\genfrac{}{}{0pt}{}{N(CH_3)_2}{NO} HCl) + 2(C_{20}H_{16}O_9N) = 2(C_{28}H_{21}N_3O_3HCl) + C_6H_4\genfrac{}{}{0pt}{}{N(CH_3)_2}{NH_2} + HCl + 3H_2O$$

By recrystallization of the coloring-matter from aniline a product of a copper-colored luster is obtained. In concentrated sulphuric acid this product gives a cherry-colored solution, not a blue one.

By sulphurating the coloring-matter at a low temperature with fuming sulphuric acid of twenty-four per cent., a sulpho-acid is obtained, the ammonia-salt of which is soluble in water and produces a pure blue shade.

Wool is dyed in an acidulated bath in shades similar to induline.

For rendering the coloring-matter soluble in water, the following is a method which gives better results: Five parts of coloring-matter, twenty parts of alcohol, and twenty parts of a solution (forty per cent.) of bisulphite of soda are heated for some time. The mass, at first of a dark color, changes into a magma of light-green crystals. Diluted with water, filtered, and pressed, it is ready for use in form of a paste. Combinations of similar qualities are obtained if, instead of the aniline, ortho or para toluidine or xylidine are submitted to the action of tannin. The nitroso-dimethylaniline can also be replaced by the nitroso derivatives of diethylaniline, of methylethylaniline, or of chinondichlordiamide. However, the products thus obtained do not show any advantages over the derivative of nitroso-dimethylaniline, as described in the above example.

What I claim as new and original, and what I desire to secure by Letters Patent, is—

A new product, the blue coloring-matter or dye-stuff, as above described, and showing the following characteristics: the dye-stuff is an olive-green crystalline powder which is insoluble in water, diluted alkalies, and benzol, scarcely soluble in alcohol and diluted acids, rather easily soluble in glacial acetic acid, showing a dark-blue color, and by treatment with bisulphite of soda and alcohol it can also be rendered soluble in water.

In testimony whereof I have hereunto set my hand in the presence of two subscribing witnesses.

JOHANNES MOHLER.

Witnesses:
GEORGE GIFFORD,
CHS. A. RICHTER.